(12) United States Patent
    Xi (10) Patent No.: US 11,164,218 B2
(45) Date of Patent: Nov. 2, 2021

(54) MEDIA RESOURCE ALLOCATION METHOD, APPARATUS, AND SYSTEM, STORAGE MEDIUM, AND COMPUTER DEVICE

(71) Applicant: TENCENT TECHNOLOGY (SHENZHEN) COMPANY LIMITED, Shenzhen (CN)

(72) Inventor: Minghao Xi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/931,295

(22) Filed: Jul. 16, 2020

(65) Prior Publication Data

US 2020/0349613 A1    Nov. 5, 2020

Related U.S. Application Data

(63) Continuation of application No. PCT/CN2019/086943, filed on May 15, 2019.

(30) Foreign Application Priority Data

Jun. 19, 2018    (CN) .......................... 201810628879.2

(51) Int. Cl.
  *G06Q 30/00*    (2012.01)
  *G06Q 30/02*    (2012.01)
  (Continued)

(52) U.S. Cl.
  CPC ..... *G06Q 30/0275* (2013.01); *G06Q 30/0255* (2013.01); *G06Q 30/08* (2013.01); *H04L 9/0643* (2013.01); *H04L 2209/38* (2013.01)

(58) Field of Classification Search
  CPC .......... G06Q 30/0275; G06Q 30/0255; G06Q 30/08; H04L 9/0643; H04L 2209/38
  See application file for complete search history.

(56) References Cited

U.S. PATENT DOCUMENTS

2009/0313120 A1* 12/2009 Ketchum ............... G06Q 30/02
                                                           705/14.51
2015/0310476 A1* 10/2015 Gadwa ............... G06Q 30/0226
                                                           705/14.27
(Continued)

FOREIGN PATENT DOCUMENTS

CN    106897902 A    6/2017
CN    107454114 A    12/2017
(Continued)

OTHER PUBLICATIONS

International Search Report dated Aug. 14, 2019 in International Application No. PCT/CN2019/086943, (5 pages).
(Continued)

*Primary Examiner* — Scott C Anderson
(74) *Attorney, Agent, or Firm* — Oblon, McClelland, Maier & Neustadt, L.L.P.

(57) ABSTRACT

This application includes a media resource allocation method, performed by any media resource allocation server in a blockchain system. In the method, media resource information is received from a media resource server. Media resources for a plurality of media resource request servers are allocated according to (i) media resource requirements of the plurality of media resource request servers, (ii) the media resource information, and (iii) a preset allocation rule. The transaction data generated in the media resource allocation process is stored into the target blockchain.

18 Claims, 5 Drawing Sheets

Media resource allocation system (51) Int. Cl.
  *G06Q 30/08* (2012.01)
  *H04L 9/06* (2006.01)

(56) References Cited

U.S. PATENT DOCUMENTS

| | | | |
|---|---|---|---|
| 2016/0099813 A1* | 4/2016 | Suryavanshi | H04L 9/14 |
| | | | 713/175 |
| 2016/0364766 A1* | 12/2016 | Mansour | G06Q 30/0275 |
| 2018/0012311 A1 | 1/2018 | Small et al. | |
| 2018/0152289 A1* | 5/2018 | Hunt | G06Q 20/223 |
| 2018/0308134 A1 | 10/2018 | Manning et al. | |
| 2018/0357683 A1* | 12/2018 | Pickover | G06Q 30/0282 |
| 2019/0012249 A1* | 1/2019 | Mercuri | G06Q 20/308 |
| 2019/0370486 A1* | 12/2019 | Wang | G06Q 20/401 |

FOREIGN PATENT DOCUMENTS

| | | | |
|---|---|---|---|
| CN | 107679976 A | 2/2018 | |
| CN | 108053252 | 5/2018 | |
| CN | 108701325 | 10/2018 | |
| CN | 108805627 | 11/2018 | |
| EP | 3394818 | 10/2018 | |
| GB | 2549085 A * | 10/2017 | G06F 21/57 |
| JP | 5224224 B1 | 7/2013 | |
| JP | 2015-172845 A | 10/2015 | |
| JP | 2017-525062 A | 8/2017 | |
| JP | 2018-055473 A | 4/2018 | |
| JP | 2019-507446 | 3/2019 | |
| KR | 2018-0095912 | 8/2018 | |
| WO | 2016196496 | 12/2016 | |
| WO | 2017112664 | 6/2017 | |
| WO | WO 2017/136879 A1 | 8/2017 | |
| WO | WO 2018/047982 A1 | 3/2018 | |

OTHER PUBLICATIONS

Written Opinion dated Aug. 14, 2019 in International Application No. PCT/CN2019/086943 (4 pages).
Chinese Office Action Issued in Application CN 201810628879.2 dated Oct. 19, 2020 with concise English translation, (10 pages).
Office Action dated Aug. 30, 2021, in corresponding Japanese Patent Application No. 2020-552900 with English translation, 12 pages.
Distributed Book Technology Model Development of Mobile Payment used, Eightieth (2018) National Conference Collection (4) Interface Computer, Human Society, General Incorporated Information Processing Society, Jan. 13, 2018, pp. 567 to 568.

* cited by examiner

MEDIA RESOURCE ALLOCATION METHOD, APPARATUS, AND SYSTEM, STORAGE MEDIUM, AND COMPUTER DEVICE

RELATED APPLICATION

This application is a continuation of International Application No. PCT/CN2019/086943, filed on May 15, 2019, which claims priority to Chinese Patent Application No. 201810628879.2, entitled "MEDIA RESOURCE ALLOCATION METHOD, APPARATUS, AND SYSTEM, MEDIUM, AND DEVICE" and filed on Jun. 19, 2018. The entire disclosures for the prior applications are hereby incorporated by reference in their entirety.

FIELD OF THE TECHNOLOGY

This application relates to the field of network technologies, including a media resource allocation method, apparatus, and system, a storage medium, and a computer device.

BACKGROUND OF THE DISCLOSURE

Real time bidding (RTB) is a bidding technology in which evaluation is performed and a bid is made for a presentation action of each user on millions of websites. The core of the RTB is a demand-side platform (DSP). For media, the RTB may bring more advertisement sales, implement sales process automation, and reduce expenditure of various fees. For advertisers and agency companies, the most direct benefit is that an effect and a return on investment are improved.

An objective of bidding is to contend for media resources, that is, allocation of the media resources. In a related media resource allocation method, usually, an advertisement exchange (ADX) server performs a bidding algorithm, and allocates a media resource for a DSP succeeding in bidding.

However, the ADX server usually provides a service for a same institution, a bidding algorithm is performed inside the ADX server, a bidding process thereof is not transparent, and an entire media resource allocation process has relatively low authenticity.

SUMMARY

A media resource allocation method of a media resource allocation server in a blockchain system is provided. The blockchain system includes a plurality of media resource allocation servers configured to manage a target blockchain that stores transaction data in a media resource allocation process. In the method, media resource information is received from a media resource server. Media resources for a plurality of media resource request servers are allocated according to (i) media resource requirements of the plurality of media resource request servers, (ii) the media resource information, and (iii) a preset allocation rule. The transaction data generated in the media resource allocation process is stored into the target blockchain.

A media resource allocation system is provided. The system includes a media resource allocation server of a plurality of media resource allocation servers configured to manage a target blockchain that stores transaction data in a media resource allocation process. The media resource allocation server includes processing circuitry that is configured to receive media resource information from a media resource server. The processing circuitry is configured to allocate media resources for a plurality of media resource request servers according to (i) media resource requirements of the plurality of media resource request servers, (ii) the media resource information, and (iii) a preset allocation rule. The processing circuitry is further configured to store the transaction data generated in the media resource allocation process into the target blockchain.

In some embodiments, the processing circuitry of the media resource allocation server is configured to generate a block based on the transaction data, broadcast the block to the plurality of media resource allocation servers, and store, in a case that the plurality of media resource allocation servers reach a consensus on the block, the block into the target blockchain.

In some embodiments, the processing circuitry of the media resource allocation server is configured to generate the block based on transaction data generated within a first preset duration.

In some embodiments, the plurality of media resource allocation servers vote at intervals of a second preset duration to elect the media resource allocation server as a leader node.

A media resource allocation apparatus is provided. The apparatus is one of a plurality of media resource allocation servers in a blockchain system, the plurality of media resource allocation servers being configured to manage a target blockchain that stores transaction data in a media resource allocation process. The apparatus includes processing circuitry configured to receive media resource information from a media resource server. The processing circuitry is configured to allocate media resources for a plurality of media resource request servers according to (i) media resource requirements of the plurality of media resource request servers, (ii) the media resource information, and (iii) a preset allocation rule. The processing circuitry is further configured to store the transaction data generated in the media resource allocation process into the target blockchain.

According to an aspect, a computer device is provided. The computer device includes a processor and a memory, the memory storing at least one computer-readable instruction, the computer-readable instruction being loaded by the processor to perform a media resource allocation method. In the method, media resource information is received from a media resource server. Media resources for a plurality of media resource request servers are allocated according to (i) media resource requirements of the plurality of media resource request servers, (ii) the media resource information, and (iii) a preset allocation rule. The transaction data generated in the media resource allocation process is stored into the target blockchain.

A non-transitory computer-readable storage medium is provided. The non-transitory computer readable storage medium stores instructions which when executed by a processor cause the processor to perform a media resource allocation method. In the method, media resource information is received from a media resource server. Media resources for a plurality of media resource request servers are allocated according to (i) media resource requirements of the plurality of media resource request servers, (ii) the media resource information, and (iii) a preset allocation rule. The transaction data generated in the media resource allocation process is stored into the target blockchain

BRIEF DESCRIPTION OF THE DRAWINGS

The following briefly describes the accompanying drawings required for describing the embodiments. The accompanying drawings in the following descriptions show merely

DESCRIPTION OF EMBODIMENTS

The following describes technical solutions in embodiments of this application with reference to the accompanying drawings in the embodiments of this application. The described embodiments are merely some embodiments of this application rather than all of the embodiments. All other embodiments obtained by a person of ordinary skill in the art based on the embodiments of this application shall fall within the protection scope of this application.

Some terms used in the following specific description process are explained:

A consortium chain, also referred to as a consortium blockchain, includes a blockchain for which the consensus process is controlled by preselected nodes. In the consortium chain, all or some functions are only open to node members inside the chain, and blockchain nodes in the consortium chain may customize a read/write permission, a query permission, and the like based on requirements.

An intelligent contract includes a contract program that is automatically executed according to a particular condition, may perform an operation on data stored on a chain, and is an important path through which a user interacts with a blockchain and implements service logic by using the blockchain. For example, institutions may access a media resource allocation system by using an intelligent contract deployed on a blockchain in servers.

A media resource, also referred to as traffic, includes an exposure opportunity provided by a resource sell-side platform, namely, a media side. When any demand side obtains the media resource in a manner such as bidding, an advertisement corresponding to the demand side may be placed onto the media resource, so that users can view the advertisement placed on the media resource.

In a delegated proof of stake (DPOS) mechanism, a block is created by a credible account elected through voting (e.g., the credible account may be a trustee whose quantity of votes ranks top 101). The DPOS mechanism is similar to a joint-stock company, in which common stockholders cannot be members of the board of directors, and need to elect a representative (trustee) through voting to represent them in decision making, and is a consensus mechanism having low energy consumption, relatively strong decentralization, and a high confirmation speed.

Display advertising includes a graphical advertising technology.

Programmatic advertising includes performing advertising exchanges and management by using a technical means. An advertiser may programmatically purchase a media resource and automatically implement precise target audience orientation by using an algorithm and a technology, to advertise to the right people.

The ADX is an advertisement exchange platform, where a media resource may be auctioned in an auction manner on the ADX platform.

A demand-side platform (DSP) refers to a programmatically docked advertising agency.

A sell-side platform (SSP) refers to a media side configured to provide media resources.

Figure 1:
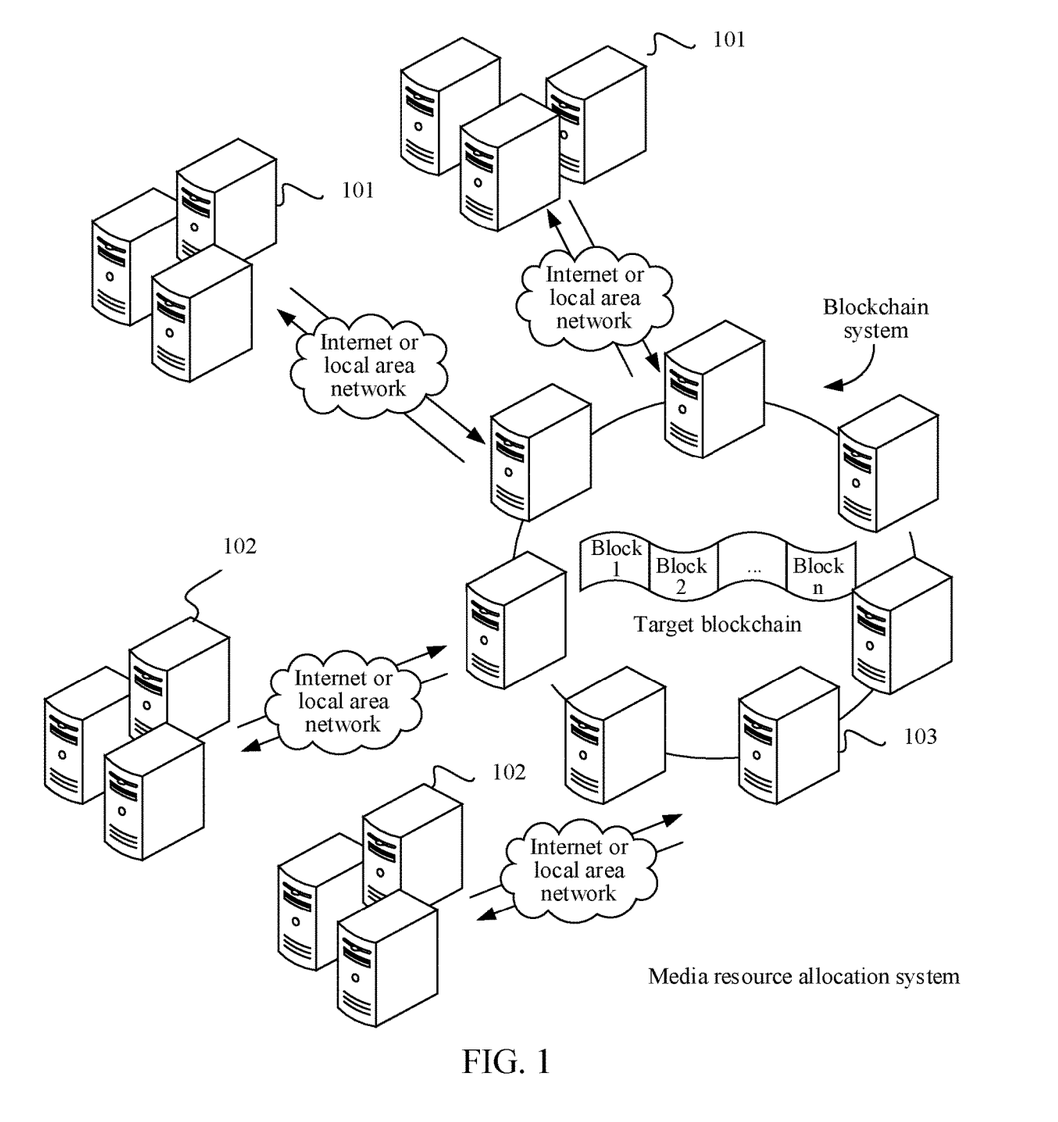
FIG. 1 is a structural diagram of a media resource allocation system according to an embodiment of this application.

FIG. 1 is a structural diagram of a media resource allocation system according to an embodiment of this application. The system includes: a media resource server 101, a plurality of media resource request servers 102, and a plurality of media resource allocation servers 103. The plurality of media resource allocation servers is equipped with a target blockchain, the target blockchain being configured to store transaction data in a media resource allocation process.

The media resource server 101 may be a server of a media resource provider, and is configured to provide a media resource. The media resource server can refer to an SSP. The media resource server 101 may alternatively be a server of different media resource providers. No limitation is imposed in this embodiment of this application. For example, the media resource server 101 may be a portal site server of a company A, and may also be a video sharing server of a company B.

The plurality of media resource request servers 102 may be servers of media resource demand sides. The media resource request servers can refer to DSPs, may be institutions that need advertising, or may be advertising agencies and the like. No limitation is imposed in this embodiment of this application.

The plurality of media resource allocation servers 103 may be servers provided by one or more media resource providers, and are configured to allocate media resources. The media resource allocation servers can refer to ADXs. The plurality of media resource allocation servers 103 are configured as a blockchain system, each of the media resource allocation servers 103 stores a target blockchain in the blockchain system. The target blockchain stores transaction data in a media resource allocation process by using a chain structure. The media resource allocation server 103 may receive media resource information transmitted by the media resource server 101, allocate media resources for the plurality of media resource request servers according to media resource requirements of the plurality of media resource request servers 102, the media resource information, and a preset allocation rule; and store transaction data generated in a media resource allocation process into the target blockchain.

Figure 2:
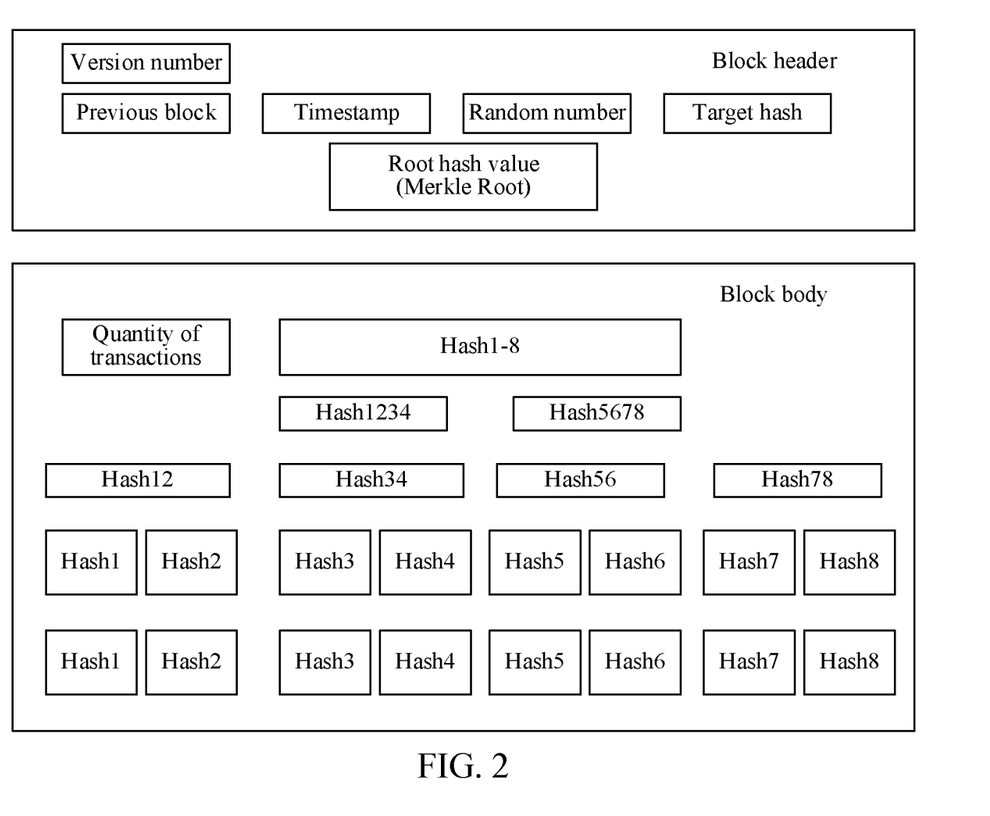
FIG. 2 is an exemplary diagram of storing data by a block according to an embodiment of this application.

The transaction data is stored in a form of a block in the chain structure. Referring to FIG. 2, one block includes a block header and a block body. The block header includes a version number, a hash value of a previous block, a timestamp, a random number, a target hash, and a root hash value (Merkle Root), and the block body includes a quantity of transactions and hash values of a plurality of pieces of transaction data. FIG. 2 is merely an exemplary diagram of storing data by one block, and a specific storage manner thereof is not limited in this embodiment of this application.

The target blockchain configured on the plurality of media resource allocation servers 103 may be a consortium chain. The plurality of media resource allocation servers 103 may also be respectively equipped with private chains or some of the plurality of media resource allocation servers 103 may be equipped with a common blockchain. No limitation is imposed in this embodiment of this application.

In this embodiment of this application, the media resource server is configured to transmit media resource information to the plurality of media resource allocation servers. The media resource information is used for indicating a media resource that can be currently allocated. For example, the media resource information may be a media identifier, and the media identifier may be used for uniquely determining a media resource.

The plurality of media resource request servers is configured to request media resources from the plurality of media resource allocation servers. The process of requesting the media resources may be that the media resource request servers may transmit media resource allocation requests to the media resource allocation server, or may be that the plurality of media resource request servers register media resource requirements on the media resource allocation server, so that when there is a media resource matching the media resource requirements, the media resource allocation server transmits a bidding request to the media resource request servers, to enable the media resource request servers to participate in bidding.

The plurality of media resource allocation servers is configured to: allocate media resources for the plurality of media resource request servers according to media resource requirements of the plurality of media resource request servers, the media resource information, and a preset allocation rule; and store transaction data generated in a media resource allocation process into the target blockchain. The preset allocation rule may be a bidding algorithm. The bidding algorithm may be a highest price algorithm or a second highest price algorithm. No limitation is imposed in this embodiment of this application.

Figure 3:
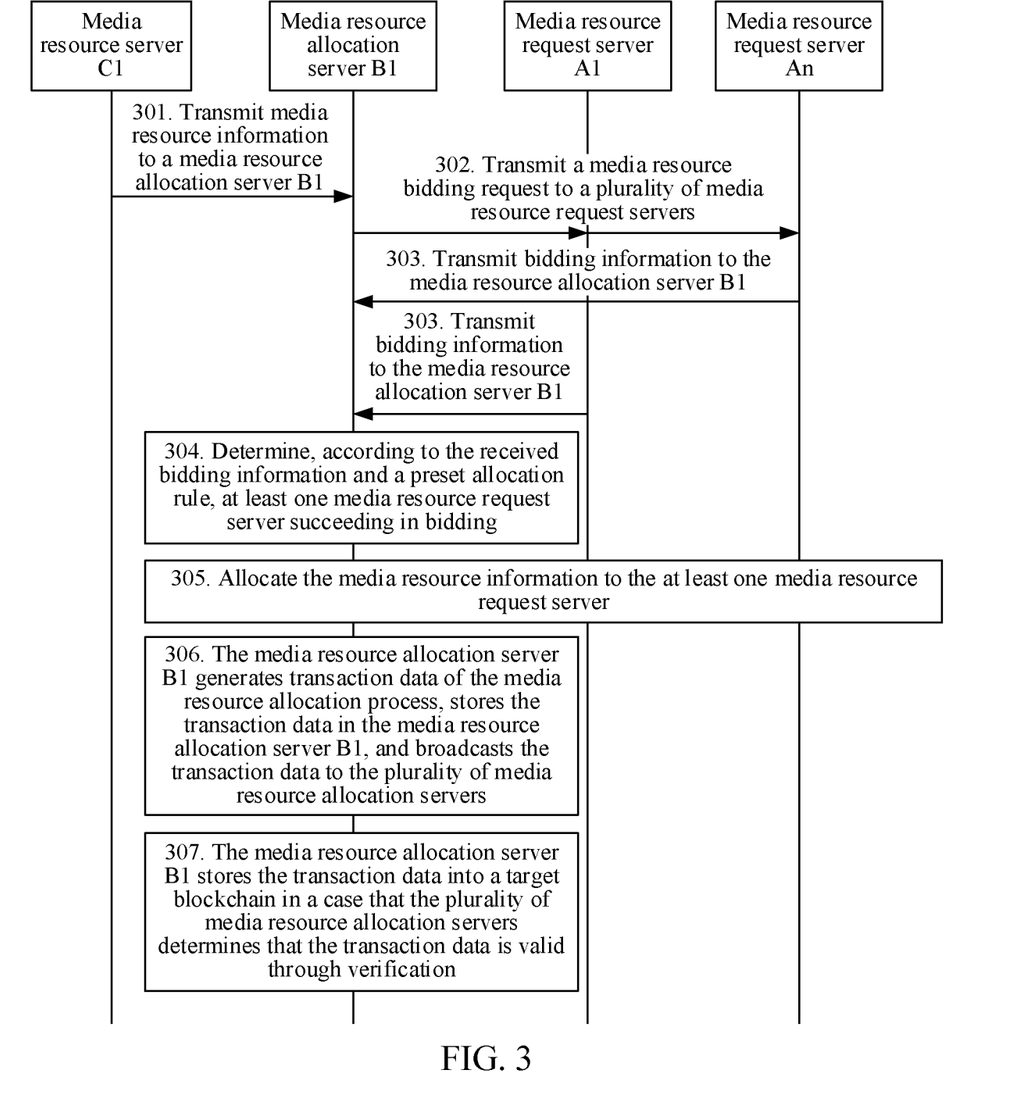
FIG. 3 is a flowchart of a media resource allocation method according to an embodiment of this application.

A media resource allocation process based on interaction between the servers is described below. Referring to FIG. 3, the media resource allocation process specifically includes the following steps.

In step 301, media resource information is transmitted to media resource allocation servers.

In this embodiment of this application, a media resource server C1 transmits media resource information to a plurality of media resource allocation servers in a blockchain system. An example in which the media resource server C1 provides an available media resource is merely used for description. The media resource information may be a media resource identifier used for uniquely identifying a media resource. The media resource information may also carry information such as a type of the media resource and a conversion rate of the media resource, for matching against media resource requirements from the media resource request servers.

All the plurality of media resource allocation servers in the blockchain system may receive the media resource information. Further, a leader node in the blockchain system may initiate a bidding process in response to the media resource information.

In step 302, a media resource bidding request is transmitted to the plurality of media resource request servers.

After receiving the media resource information, a media resource allocation server B1 transmits a media resource bidding request to the plurality of media resource request servers. An example in which the media resource allocation server B1 is the leader node in the blockchain system is used for description in this embodiment of this application. That is, for the blockchain system, a node in a leader state may initiate a bidding process when receiving the media resource information. That is, the media resource allocation server B1 transmits a media resource bidding request to the plurality of media resource request servers.

The media resource bidding request may be transmitted to some rather than all of the plurality of media resource request servers. The some of the media resource request servers may be servers having media resource requirements matching the media resource information. Optionally, step 302 may be implemented through the following process: after receiving the media resource information, the media resource allocation server B1 determines a plurality of target media resource request servers according to the media resource requirements of the plurality of media resource request servers, the target media resource request servers being servers having media resource requirements matching the media resource information; and transmits the media resource bidding request to the plurality of target media resource request servers.

The media resource requirements may be transmitted to the plurality of media resource allocation servers by the media resource request servers. Specifically, the media resource requirements may be carried in media resource allocation requests.

In step 303, bidding information is transmitted to the media resource allocation server B1.

When receiving the media resource bidding request, the plurality of media resource request servers transmit bidding information to the media resource allocation server B1. The media resource bidding request may carry the media resource information, to enable the media resource request servers to learn of specific conditions of the media resource, and determine whether to participate in bidding.

Any media resource request servers may determine, when receiving the media resource bidding request, whether to transmit bidding information to the media resource allocation server according to a media resource requirement of the media resource request server, transmit, in response to determining that a to-be-bidden-for media resource matches the media resource requirement of the media resource request server, bidding information to the media resource allocation server, where the bidding information may include a bid of the media resource request server; and skip, in response to determining that the to-be-bidden media resource does not match the media resource requirement of the media resource request server, transmitting bidding information to the media resource allocation server, and skip participating in this bidding process.

In step 304, at least one media resource request server succeeding in bidding is determined according to the received bidding information and a preset allocation rule.

When receiving bidding information transmitted by the plurality of media resource request servers A1 to An, the media resource allocation server B1 determines a media resource request server succeeding in the bidding according to the received bidding information and the preset allocation rule. The media resource allocation servers are equipped with a preset allocation rule, for example, allocating according to a highest price or allocating according to a second highest price. Therefore, when receiving a plurality of pieces of bidding information, the media resource allocation server may determine, according to bids of the media resource request servers in the bidding information, the server succeeding in the bidding. Further, according to different used allocation rules, one or more media resource request servers may be finally determined as servers succeeding in the bidding.

In step 305, the media resource information is allocated to the at least one media resource request server.

The media resource allocation server B1 allocates the media resource information to the media resource request server. The allocation may mean that: a use permission of the media resource corresponding to the media resource information is transmitted to the media resource request server, or may mean that: address information of the media resource is transmitted to the media resource request server. No limitation is imposed in this embodiment of this application.

When succeeding in bidding, a media resource request server may perform a transaction transfer in real time, or perform transaction bookkeeping in real time, to perform a one-time transfer after a particular amount of money is subsequently reached. No limitation is imposed in this embodiment of this application.

In step 306, the media resource allocation server B1 generates transaction data of the media resource allocation process, stores the transaction data in the media resource allocation server B1, and broadcasts the transaction data to the plurality of media resource allocation servers.

The transaction data may include information such as the media resource information, the media resource request server succeeding in the bidding, and a transaction amount. The transaction data may be stored and broadcast in a manner of a stack instruction.

In step 307, the media resource allocation server B1 stores the transaction data into the target blockchain in a case that the plurality of media resource allocation servers determines that the transaction data is valid through verification.

Figure 4:
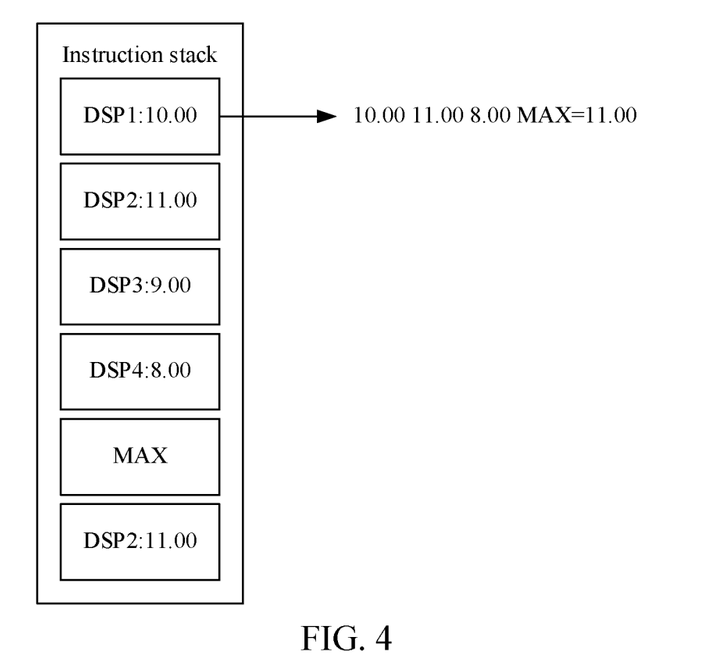
FIG. 4 is an exemplary diagram of a data processing manner according to an embodiment of this application.

In this embodiment of this application, an intelligent contract of the bidding process may be performed in a manner of a stack function. That is, the media resource allocation servers may determine whether the transaction is valid through verification in a manner of being sequentially popped from a stack. For a specific manner of being popped from a stack, refer to the example shown in FIG. 4.

In some embodiments, step 307 may be implemented through the following process: performing verification on the transaction data according to the bidding information received by the media resource allocation server; and determining that the transaction data is valid in a case that transaction data that is obtained based on the received bidding information and the preset allocation rule is consistent with the transaction data. When any one of the media resource allocation servers determines that the transaction data is valid, the media resource allocation server may broadcast a response indicating validity in the blockchain system. For the blockchain system, when a server that presets a proportion threshold and that is in the plurality of media resource allocation servers determines the transaction data is valid through verification, it is determined that the transaction data is valid in verification performed by the blockchain system, and the bidding result may be published.

In some embodiments, the specific process in which the media resource allocation server stores the transaction data into the target blockchain may include: generating, by the media resource allocation server, a block based on the transaction data; broadcasting the block to the plurality of media resource allocation servers; and storing, in a case that the plurality of media resource allocation servers reach a consensus on the block, the block into the target blockchain.

Figure 5:
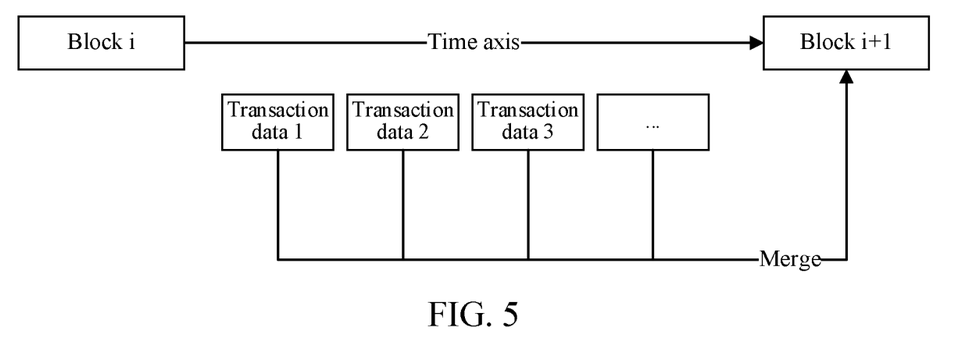
FIG. 5 is a schematic diagram of a relationship between transaction data and blocks according to an embodiment of this application.

The media resource allocation server generates the block based on transaction data generated within a first preset duration, referring to FIG. 5. Corresponding transaction data may be generated for each bidding process. During block generation, unmerged transaction data may be merged at intervals of a period of time, and a block configured to store the transaction data generated within the first preset duration is generated.

In a possible implementation, the plurality of media resource allocation servers vote at intervals of a second preset duration to elect a media resource allocation server as a leader node. The leader node is configured to generate a block.

For the blockchain system, a representative may be elected in a DPOS manner, to generate blocks by turns. That is, node devices (e.g., the media resource allocation servers) having RTB transaction currency vote to generate a series of leader nodes, and the leader nodes are responsible for generating blocks on the blockchain by turns at intervals of a period of time and within a time range.

In some embodiments, in a case that a timeout rate of any one of the media resource allocation servers is greater than a preset timeout rate or a quantity of invalid transactions of any one of the media resource allocation servers is greater than a preset quantity, the media resource allocation server is excluded from voted objects.

A credit mechanism may be established for a case of node timeout or an invalid transaction. A node device having a high timeout rate and a large proportion of invalid transactions loses rights of block creation and transaction processing. The timeout rate refers to a proportion of response timeouts of a media resource allocation server after receiving transaction data, and may represent a processing capability and reliability of the media resource allocation server. Therefore, when a timeout rate of any one of the media resource allocation servers is greater than a preset timeout rate, the media resource allocation server may be excluded in a next round of voting process; and if a proportion of transaction data that is broadcast by a media resource allocation server and on which validity verification fails is greater than a preset proportion, the media resource allocation server may be excluded in a next round of voting process, so that processing in the entire blockchain system is more reliable and more efficient.

In some embodiments, a media resource allocation server that generates a block and that is in the plurality of media resource allocation servers obtains a commission from a successful bidding transaction in the media resource allocation system. The media resource allocation server generating the block may obtain a commission of a particular proportion according to successful bidding transactions in the blockchain, thereby encouraging more third-party institutions or organizations to participate in overall bidding. A specific form of the commission may be RTB transaction currency.

Figure 6:
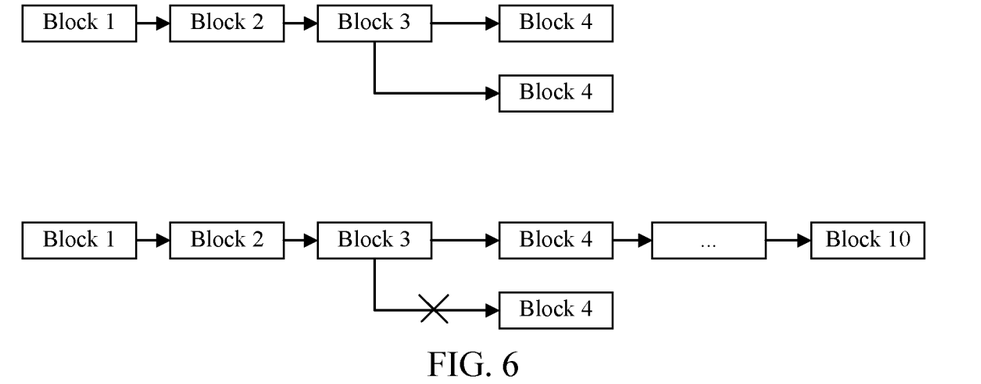
FIG. 6 is a schematic diagram of a form of a blockchain according to an embodiment of this application.

In some embodiments, there may be a case in which the target blockchain includes two links. As shown in FIG. 6, the case may be caused by splitting of the blockchain system. Therefore, when there are two chains, the longer one may be used as an active chain, and the shorter one may be used as a backup chain. When it is detected that the target blockchain includes two links, whether a block height difference between the two links is greater than a preset threshold is detected. If the block height difference is greater than the preset threshold, the shorter one in the two links is deleted, and transaction data stored in a block in the shorter link is released into unmerged transaction data, so that a block is regenerated based on the transaction data, and is added into the blockchain. The preset threshold may be set to any value, and may be set based on a processing capability (for example, a quantity of daily transactions) of the blockchain system. For example, the preset threshold may be set to 6.

In the foregoing technical solution, a plurality of media resource allocation institutions join a blockchain system, and jointly participate in an RTB bidding process; and servers in the blockchain system store transaction data generated in the bidding process, thereby greatly improving authenticity of an entire media resource allocation process.

An optional embodiment of this application may be formed by using any combination of all the foregoing optional technical solutions, and details are not described herein.

Figure 7:
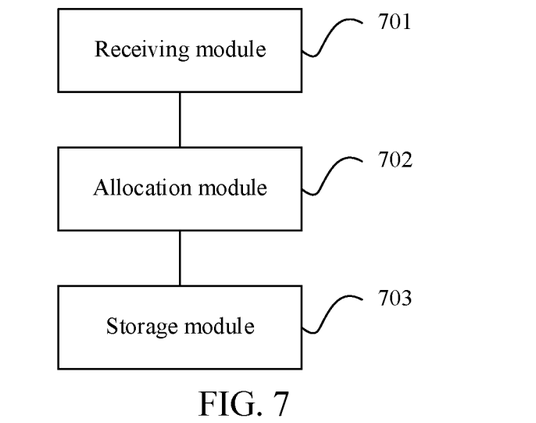
FIG. 7 is a schematic structural diagram of a media resource allocation apparatus according to an embodiment of this application.

FIG. 7 is a schematic structural diagram of a media resource allocation apparatus according to an embodiment of this application. The apparatus is applied to any media resource allocation server in a blockchain system, a plurality of media resource allocation servers in the blockchain system being equipped with a target blockchain, the target blockchain being configured to store transaction data in a media resource allocation process. Referring to FIG. 7, the apparatus includes: a receiving module 701, an allocation module 702, and a storage module 703. One or more of the modules can be implemented by processing circuitry.

The receiving module 701 is configured to receive media resource information transmitted by a media resource server.

The allocation module 702 is configured to allocate, according to media resource requirements of a plurality of media resource request servers, the media resource information, and a preset allocation rule, media resources for the plurality of media resource request servers.

The storage module 703 is configured to store transaction data generated in a media resource allocation process into the target blockchain.

In some embodiments, the allocation module 702 is configured to transmit a media resource bidding request to the plurality of media resource request servers; and in a case that bidding information transmitted by the plurality of media resource request servers is received, determine according to the received bidding information and the preset allocation rule, a media resource request server succeeding in bidding, and allocate the media resource information to the media resource request server.

In some embodiments, the storage module 703 includes a transaction data generation unit, configured to generate transaction data of the media resource allocation process, store the transaction data in the media resource allocation server, and broadcast the transaction data to the plurality of media resource allocation servers; and a storage unit, configured to store the transaction data into the target blockchain in a case that the blockchain system determines that the transaction data is valid through verification.

In some embodiments, the storage unit is configured to generate a block based on the transaction data, broadcast the block to the plurality of media resource allocation servers, and store, in a case that the plurality of media resource allocation servers reach a consensus on the block, the block into the target blockchain.

In some embodiments, that the storage unit is configured to generate a block based on the transaction data includes: generating the block based on transaction data generated within a first preset duration.

In some embodiments, the apparatus further includes a verification module. The verification module is configured to perform verification on the transaction data according to the bidding information received by the media resource allocation server; and determine that the transaction data is valid in a case that transaction data that is obtained based on the received bidding information and the preset allocation rule is consistent with the transaction data.

In some embodiments, the apparatus further includes a branch processing module. The branch processing module is configured to detect, in a case that it is detected that the target blockchain includes two links, whether a block height difference between the two links is greater than a preset threshold; and delete, in a case that the block height difference is greater than the preset threshold, a shorter link in the two links, and release transaction data stored by a block in the shorter link into unmerged transaction data.

In some embodiments, the apparatus further includes a commission obtaining module that is configured to obtain a commission from a successful bidding transaction.

In some embodiments, the media resource allocation server is a media resource allocation server in a leader state in the blockchain system.

In some embodiments, in a case that a timeout rate of the media resource allocation server is greater than a preset timeout rate or a quantity of invalid transactions of the media resource allocation server is greater than a preset quantity, the media resource allocation server is excluded from voted objects of a leader node.

Division of the foregoing functional modules is only described for exemplary purposes when the media resource allocation apparatus provided in the foregoing embodiments allocates media resources. In an actual application, the foregoing functions may be allocated and completed by different functional modules according to requirements, that is, the internal structure of the device is divided into different functional modules, to complete all or some of the functions described above. In addition, the media resource allocation apparatus and media resource allocation method embodiments provided in the foregoing embodiments may be implemented and performed in a similar manner. For a specific implementation process, refer to the method embodiments, and details are not described herein again.

Figure 8:
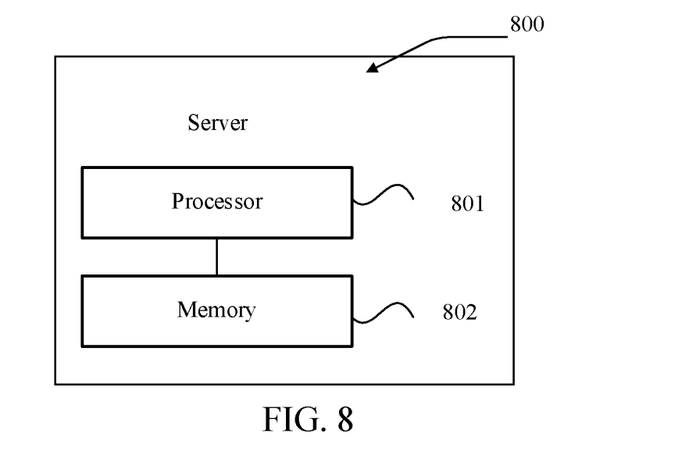
FIG. 8 is a schematic structural diagram of a server according to an embodiment of this application.

FIG. 8 is a schematic structural diagram of a server according to an embodiment of this application. The server 800 may vary greatly due to different configurations or performance, and may include one or more processors (e.g., processing circuitry such as central processing units (CPUs)) 801 and one or more memories 802. The memory 802 stores at least one computer-readable instruction, the at least one computer-readable instruction being loaded and executed by the processor 801 to implement the media resource allocation method provided in the foregoing method embodiments. The server may further include components such as a wired or wireless network interface, a keyboard, and an input/output interface for input/output. The server may further include another component configured to implement functions of a device, and details are not described herein again.

In an exemplary embodiment, a non-volatile computer-readable storage medium or non-transitory computer-readable storage medium is further provided, for example, a memory storing a computer-readable instruction. The computer-readable instruction may be executed by a processor in a server to complete the media resource allocation method in the foregoing embodiments. For example, the non-volatile computer-readable storage medium may be a read-only memory (ROM), a random access memory (RAM), a CD-ROM, a magnetic tape, a floppy disk, or an optical data storage device.

A person of ordinary skill in the art may understand that all or some of steps of the foregoing embodiments may be implemented by hardware or a program instructing related hardware. The program may be stored in a computer-readable storage medium. The computer-readable storage medium may be a ROM, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A media resource allocation method in a blockchain system, the blockchain system including a plurality of media resource allocation servers configured to manage a target blockchain, the method comprising:
   receiving, by processing circuitry of a media resource allocation server of the plurality of media resource allocation servers, media resource information from a media resource server;
   allocating, by the processing circuitry according to a media resource allocation process, media resources for a plurality of media resource request servers according to (i) media resource requirements of the plurality of media resource request servers, (ii) the media resource information, and (iii) a preset allocation rule;
   generating transaction data of the media resource allocation process;
   broadcasting the transaction data to the plurality of media resource allocation servers, via a stack instruction; and
   storing the transaction data into the target blockchain only when the transaction data is determined to be valid through verification by any one of the plurality of media resource allocation servers.

2. The media resource allocation method according to claim 1, wherein the allocating comprises:
   transmitting a media resource bidding request to the plurality of media resource request servers; and
   when bidding information is received from the plurality of media resource request servers,
   selecting a particular media resource request server of the plurality of media resource request servers according to (i) the received bidding information and (ii) the preset allocation rule, and
   allocating the media resource information to the particular media resource request server.

3. The media resource allocation method according to claim 1, wherein the storing further comprises:
   generating a block based on the transaction data;
   broadcasting the block to the plurality of media resource allocation servers; and
   storing, when the plurality of media resource allocation servers reach a consensus on the block, the block into the target blockchain.

4. The media resource allocation method according to claim 3, wherein the generating the block comprises:
   generating the block based on all pieces of transaction data generated within a first preset duration.

5. The media resource allocation method according to claim 1, further comprising:
   performing the verification on the transaction data according to bidding information received by the media resource allocation server; and
   determining that the transaction data is valid when the transaction data obtained based on the received bidding information and the preset allocation rule is consistent with the transaction data.

6. The media resource allocation method according to claim 1, further comprising:
   detecting, when the target blockchain includes two links, whether a block height difference between the two links is greater than a preset threshold; and
   deleting, when the block height difference is greater than the preset threshold, a shorter link in the two links, and releasing transaction data stored by a block in the shorter link into immerged transaction data.

7. The media resource allocation method according to claim 1, further comprising:
   receiving, by the media resource allocation server, a commission from a successful bidding transaction.

8. The media resource allocation method according to claim 1, wherein the media resource allocation server is in a leader state in the blockchain system.

9. The media resource allocation method according to claim 1, further comprising:
   excluding, when a timeout rate of the media resource allocation server is greater than a preset timeout rate or a quantity of invalid transactions of the media resource allocation server is greater than a preset quantity, the media resource allocation server from selection as a leader node.

10. A media resource allocation system, comprising:
    a media resource allocation server of a plurality of media resource allocation servers configured to manage a target blockchain, the media resource allocation server including processing circuitry that is configured to
    receive media resource information from a media resource server,
    allocate, according to a media resource allocation process, media resources for a plurality of media resource request servers according to (i) media resource requirements of the plurality of media resource request servers, (ii) the media resource information, and (iii) a preset allocation rule,
    generate the transaction data of the media resource allocation process,
    broadcast the transaction data to the plurality of media resource allocation servers via a stack instruction; and
    store the transaction data into the target blockchain only when the transaction data is determined to be valid through verification by any one of the plurality of media resource allocation servers.

11. The media resource allocation system according to claim 10, further comprising:
    the media resource server configured to transmit the media resource information to plurality of media resource allocation servers;
    the plurality of media resource request servers configured to request the media resources from the plurality of media resource allocation servers; and
    the plurality of media resource allocation servers, each configured to
    allocate the media resources for the plurality of media resource request servers according to (i) the media resource requirements of the plurality of media resource request servers, (ii) the media resource information, and (iii) the preset allocation rule; and
    store the transaction data generated in the media resource allocation process into the target blockchain.

12. The media resource allocation system according to claim 10, wherein the plurality of media resource request servers is configured to transmit media resource allocation requests to the media resource allocation server, which is in a leader state in the plurality of media resource allocation servers.

13. The media resource allocation system according to claim 10, wherein the processing circuitry of the media resource allocation server is further configured to
- transmit a media resource bidding request to the plurality of media resource request servers after receiving the media resource information; and
- when bidding information is received from the plurality of media resource request servers,
  - select a particular media resource request server of the plurality of media resource request servers according to (i) the received bidding information and (ii) the preset allocation rule, and
  - allocate the media resource information to the particular media resource request server.

14. The media resource allocation system according to claim 10, wherein when a timeout rate of the media resource allocation server is greater than a preset timeout rate or a quantity of invalid transactions of any one of the media resource allocation server is greater than a preset timeout rate, the media resource allocation server is excluded from selection as a leader node.

15. The media resource allocation system according to claim 10, wherein the processing circuitry of the media resource allocation server is further configured to:
- perform the verification on the transaction data according to bidding information received by the media resource allocation server; and
- determine that the transaction data is valid when the transaction data obtained based on the received bidding information and the preset allocation rule is consistent with the transaction data.

16. The media resource allocation system according to claim 13, wherein the processing circuitry of the media resource allocation server is further configured to detect, when the target blockchain includes two links, whether a block height difference between the two links is greater than a preset threshold; and
- delete; in a case that the block height difference is greater than the preset threshold, a shorter link in the two links, and release transaction data stored by a block in the shorter link into unmerged transaction data.

17. The media resource allocation system according to claim 10, wherein the processing circuitry is further configured to receive a commission from a successful bidding transaction in the media resource allocation system.

18. A non-transitory computer-readable storage medium storing instructions which when executed by a processor cause the processor to perform a media resource allocation method in a blockchain system, the blockchain system including a plurality of media resource allocation servers configured to manage a target blockchain, the method comprising:
- receiving media resource information from a media resource server;
- allocating, according to a media resource allocation process, media resources for a plurality of media resource request servers according to (i) media resource requirements of the plurality of media resource request servers, (ii) the media resource information, and (iii) a preset allocation rule;
- generating transaction data of the media resource allocation process;
- broadcasting the transaction data to the plurality of media resource allocation servers via a stack instruction; and
- storing the transaction data into the target blockchain only when the transaction data is determined to be valid through verification by any one of the plurality of media resource allocation servers.

* * * * *